(12) United States Patent
Saviers et al.

(10) Patent No.: US 12,519,375 B2
(45) Date of Patent: Jan. 6, 2026

(54) HEADER GUIDING FLUID FLOW TO AND FROM COOLING CHANNELS IN A HIGH DENSITY MOTOR

(71) Applicant: RTX CORPORATION, Farmington, CT (US)

(72) Inventors: Kimberly Rae Saviers, Glastonbury, CT (US); Andrzej Ernest Kuczek, Bristol, CT (US); Abbas A. Alahyari, Glastonbury, CT (US); Aritra Sur, South Windsor, CT (US); Jagadeesh Kumar Tangudu, South Windsor, CT (US)

(73) Assignee: HAMILTON SUNDSTRAND CORPORATION, Charoltte, NC (US)

( * ) Notice: Subject to any disclaimer, the term of this patent is extended or adjusted under 35 U.S.C. 154(b) by 231 days.

(21) Appl. No.: 18/264,861

(22) PCT Filed: Feb. 9, 2021

(86) PCT No.: PCT/US2021/017273
§ 371 (c)(1),
(2) Date: Aug. 9, 2023

(87) PCT Pub. No.: WO2022/173420
PCT Pub. Date: Aug. 18, 2022

(65) Prior Publication Data
US 2024/0113596 A1  Apr. 4, 2024

(51) Int. Cl.
*H02K 9/20* (2006.01)
*H02K 3/24* (2006.01)

(52) U.S. Cl.
CPC .................. *H02K 9/20* (2013.01); *H02K 3/24* (2013.01)

(58) Field of Classification Search
CPC ............... H02K 9/20; H02K 3/24; H02K 9/19
(Continued)

(56) References Cited

U.S. PATENT DOCUMENTS 2,862,120 A * 11/1958 Onsrud .................. H02K 5/203
165/47
2,999,951 A * 9/1961 Flynn ....................... H02K 3/22
310/56
(Continued)

FOREIGN PATENT DOCUMENTS

DE    102019108436 A1    10/2020
ES         2319392 T3     5/2009
WO  WO-2020200661 A1 *  10/2020 ............ F28F 9/0217

OTHER PUBLICATIONS

Longo, Giovanni A.; Diani, Andrea; Righetti, Giulia; and Zilio, Claudio, "R1233zd(E) and R245fa Flow Boiling Heat Transfer and Pressure Drop inside a 4.2 mm ID Microfin Tube" (2018). 17th International Refrigeration and Air Conditioning Conference at Purdue, Jul. 9-12, 2018, 11 pages.
(Continued)

*Primary Examiner* — Ahmed Elnakib
(74) *Attorney, Agent, or Firm* — CANTOR COLBURN LLP (57) ABSTRACT

A header for an electric machine that include a stator core and one or more windings that include coolant passages formed therein. The header includes an inlet to receive a coolant, an outlet though which the coolant exits the header, an inlet plenum fluidly connected to the inlet, and an outlet plenum fluidly separated from the inlet plenum and fluidly connected to the outlet. The inlet and outlet plenums each have a varying cross section that varies from a top of the header as compared to a bottom of the header.

20 Claims, 9 Drawing Sheets

(58) Field of Classification Search
USPC .......................................................... 310/54
See application file for complete search history.

(56) References Cited

U.S. PATENT DOCUMENTS

| | | | | |
|---|---|---|---|---|
| 4,418,777 | A | 12/1983 | Stockton | |
| 4,753,284 | A * | 6/1988 | Krause | H02K 9/24 |
| | | | | 310/59 |
| 5,973,427 | A * | 10/1999 | Suzuki | H02K 3/24 |
| | | | | 310/52 |
| 6,326,709 | B1 * | 12/2001 | Adelmann | H02K 9/26 |
| | | | | 310/52 |
| 6,515,384 | B1 * | 2/2003 | Kikuchi | H02K 1/20 |
| | | | | 310/58 |
| 6,856,053 | B2 | 2/2005 | Leflem et al. | |
| 7,675,209 | B2 | 3/2010 | Masoudipour et al. | |
| 2002/0130565 | A1 * | 9/2002 | Tilton | H02K 9/20 |
| | | | | 310/58 |
| 2004/0145252 | A1 * | 7/2004 | Arimitsu | B60L 50/16 |
| | | | | 310/58 |
| 2008/0197724 | A1 * | 8/2008 | Cullen | H02K 3/24 |
| | | | | 310/58 |
| 2008/0284263 | A1 * | 11/2008 | Dessirier | H02K 5/203 |
| | | | | 310/54 |
| 2010/0176669 | A1 * | 7/2010 | Houle | H02K 9/227 |
| | | | | 310/54 |
| 2013/0076167 | A1 * | 3/2013 | Lepres | H02K 1/20 |
| | | | | 310/54 |
| 2013/0187492 | A1 | 7/2013 | Woolmer | |
| 2014/0139057 | A1 * | 5/2014 | Ho | H02K 1/148 |
| | | | | 310/54 |
| 2014/0300220 | A1 * | 10/2014 | Marvin | H02K 3/24 |
| | | | | 29/596 |
| 2017/0025911 | A1 | 1/2017 | Jewell et al. | |
| 2021/0218297 | A1 | 7/2021 | Saviers et al. | |
| 2022/0045575 | A1 * | 2/2022 | Huber | H02K 3/24 |
| 2022/0320961 | A1 * | 10/2022 | Tangudu | H02K 3/48 |
| 2023/0107498 | A1 * | 4/2023 | Leonardi | H02K 1/20 |
| | | | | 310/54 |
| 2024/0113585 | A1 * | 4/2024 | Sur | H02K 9/19 |
| 2024/0113596 | A1 * | 4/2024 | Saviers | H02K 9/20 |

OTHER PUBLICATIONS

Notification of Transmittal of the International Preliminary Report on Patentability (IPRP); for Application No. PCT/US2021/017273; mailed Aug. 24, 2023, 10 Pages.

Notification of Transmittal of the International Search Report and the Written Opinion of the International Searching Authority, or the Declaration; PCT/US2021/017273; mailed Oct. 28, 2021, 14 pages.

JP Office Action, Application No. 2023-547781, mailed Jan. 14, 2025; 10 pages, with machine translation.

* cited by examiner

HEADER GUIDING FLUID FLOW TO AND FROM COOLING CHANNELS IN A HIGH DENSITY MOTOR

CROSS REFERENCE TO RELATED APPLICATIONS

This is a US National Stage of Application No. PCT/US2021/017273, filed on Feb. 9, 2021, the disclosure of which are incorporated herein by reference.

BACKGROUND OF THE INVENTION

The subject matter disclosed herein relates to electrical machines. More specifically, the subject matter disclosed herein relates to a header for delivering a cooling fluid to a stator of a high-density electric motor.

A typical liquid cooled electric machines/motors includes a rotor having a core and one or more rotor windings (conductors) extending therethrough. In some machines, permanent magnet machines, the rotor windings are replaced with a plurality of permanent magnets. The rotor is surrounded by a stator and an air gap exists between the rotor and stator.

Similarly, the stator includes a stator core having one or more stator windings extending therethrough. High power density electric machines (either generator or motor) produce intense resistive heating of both the stator and rotor windings and eddy current and magnetic hysteresis heating of the rotor and stator cores.

Typical methods of stator cooling include utilizing an end-turn spray and thermal conduction through the back iron to a cooled housing or fluid media.

For example, traditional motor thermal management is often in the form of external fins or liquid cooling jackets. Such systems typically direct cooling liquid through one or more channels in the back iron (housing) radially outboard of the stator core. These cooling methods, however, provide cooling only on the radial and axial periphery of the stator core. Therefore, a hot spot in the stator windings can occur at the axial centerline of the stator core.

BRIEF DESCRIPTION OF THE INVENTION

A header for an electric machine that include a stator core and one or more windings that include coolant passages formed therein is disclosed. The header includes an inlet to receive a coolant, an outlet though which the coolant exits the header, an inlet plenum fluidly connected to the inlet, and an outlet plenum fluidly separated from the inlet plenum and fluidly connected to the outlet. The inlet and outlet plenums each have a varying cross section that varies from a top of the header as compared to a bottom of the header.

In any prior embodiment, the inlet plenum and the outlet plenum can be co-planar side by side and spaced parallel to each other.

In any prior embodiment, the inlet is a main inlet and the outlet is a main outlet and the header includes a front side and a back side and the header can further include a plurality of outlet passages formed on back side of the header and in fluid communication with the inlet plenum so that coolant that enters the main inlet can exit the inlet plenum and the header a plurality of inlet passages formed on a back side of the header and in fluid communication with the outlet plenum so that coolant that exited through the outlet passages and passed through a portion of a motor can enter the outlet plenum.

In any prior embodiment, wherein the inlet plenum includes an orifice plate disposed therein that divides the inlet plenum into a plenum inlet side and a plenum outlet side.

In any prior embodiment, the orifice plate includes a plurality of holes therein.

In any prior embodiment, the holes vary in size from the top of the header to the bottom of the header.

In any prior embodiment, coolant is received into the inlet plenum in the plenum inlet side, passes through the holes, enters into the plenum outlet side and then exits the header via the outlet passages.

In any prior embodiment, at least one of the plurality of outlet passages is connected to another one of the plurality of outlet passages by a first crossover section.

In any prior embodiment, at least one of the plurality of inlet passages is connected to another one of the plurality of inlet passages second crossover section.

In any prior embodiment, the inlet and outlet are arranged to receive and output coolant along an axial direction of the header.

In any prior embodiment, the inlet and outlet are arranged to receive and output coolant along a direction tangential to the header.

In any prior embodiment, the inlet and outlet are arranged to receive and output coolant along a vertical direction of the header.

Also disclosed is a motor that includes: a rotor; a stator; and a header of any prior embodiment. The header is arranged relative to the motor so that it provides coolant received in the inlet plenum into the motor and receives coolant back from the motor into the outlet plenum.

The header can provide coolant stator windings or winding separators.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As motors have become more compact alternative methods of cooling the stator may be beneficial. Herein disclosed is a header that can used in one such method. For example, the header can be used to provide and direct a refrigerant to channels formed in or near the stator. The channels can be inside of stator windings or embedded channels in winding separators disposed between the windings. Further, the channels can be provided in stator teeth in one embodiment. That is, the separators can be separate elements, stator teeth or both.

In one embodiment, disclosed is a header to direct a cooling fluid such as a refrigerant into windings and/or winding separators of a stator of an electric machine and to receive fluid back from the windings/separators.

The header can be generally circular and have both input and output plenums. In one embodiment, the plenums are eccentric. The plenums can have varying cross sections in one embodiment. In one embodiment, the plenums are side by side (parallel). In another, one plenum surrounds the other and they are generally co-planar. Other variations and configurations will be understood to exist from the below discussion. Any or all of the embodiments herein may help to provide a uniform cooling fluid flow into and out of the cooling channels.

Further, in another embodiment, rather than cooling flow, the header can be arranged such that it conductive contact with one or more heat pipes disposed in any of the channels described above.

Figure 1:
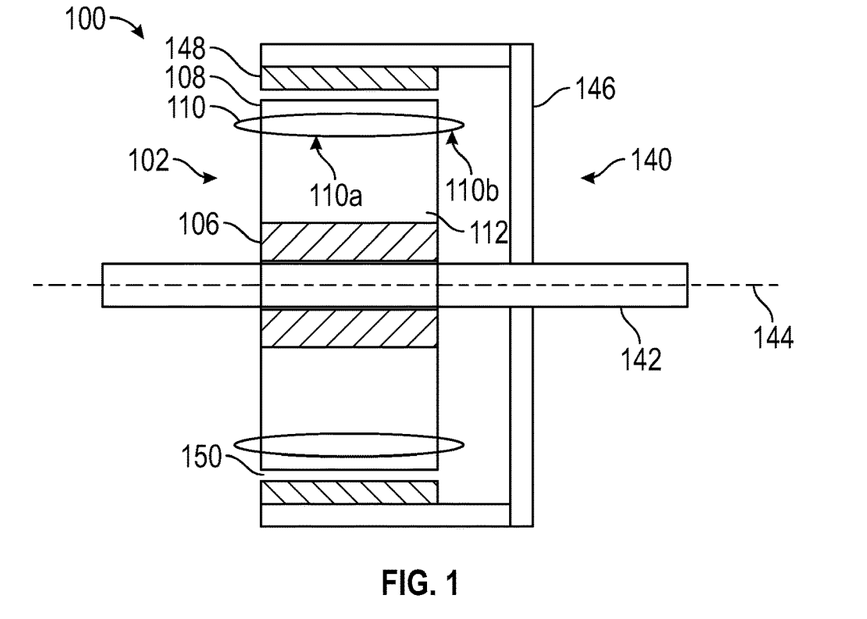
FIG. 1 is a cross-sectional view of an embodiment of an electric machine showing a rotor and a partial view of a stator.

FIG. 1 shows a schematic illustration of a cross section of an electric motor 100 that may incorporate embodiments of the present disclosure arc shown. While shown as having rotor magnets external to or outside of the stator, the orientation could be reversed. Further, the teachings herein could be applied to a context where the magnets are u-shaped and surround both inner and outer portions of the stator.

Figure 2:
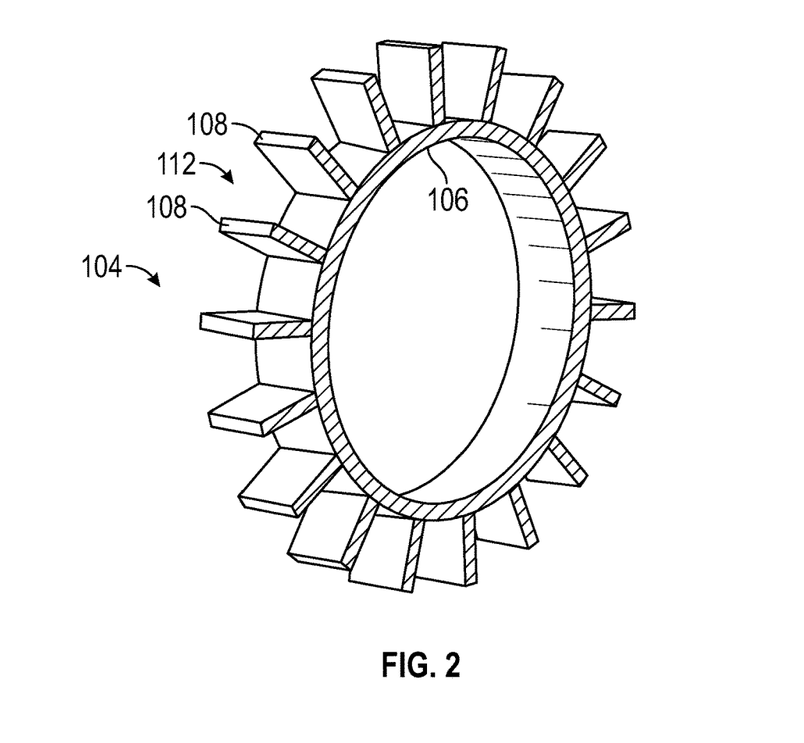
FIG. 2 is an perspective view of an embodiment of a stator for an electric machine.

In more detail, FIGS. 1 and 2 which, respectively, illustrates a cross-sectional view of the electric motor 100 and a perspective view of a simplified stator core 104. The electric motor 100 includes a stator 102 configured to surround but not rotate with a rotor shaft 142.

The stator 102 include a stator core 104 and one or more stator windings 110 supported or otherwise carried by the core 104. The windings can be formed as individual potted Litz wire windings in one embodiment. The stator core 104 includes ring hub 106 and a plurality of teeth 108 that extend outwardly from the ring hub 106. The adjacent teeth 108 form a stator slot 112 into which one or more stator windings may be disposed. That is, each slot can have a single stator winding 110 disposed therein or it can include two or more windings as shown in further examples below.

The motor 100 also includes a rotor 140. The rotor shown in FIG. 1 includes a rotor shaft 142 that rotates about a rotation axis 144. The rotor 140 also includes a magnet carrying structure 146 connected to the shaft 142. The structure 146 carries one or more permanent magnets 148.

As shown, the stator 102 (and the windings 110 carried by the stator 102) is located radially inboard of the rotor magnets 148 relative to the rotation axis 144, with a radial air gap 150 located between the rotor 140 and the stator 104. As illustrated, the rotor 140 is mounted on a shaft 110 by the structure 146. When in a "motor" mode where current is applied into the windings 110 that current will interact with the magnets 148 and cause the magnets/structure to rotate so as cause rotation of the rotor shaft 142 about axis 144 so that the shaft 142 can provide motive force to a load. Alternatively, in a "generator" mode, the shaft 142 can be driven such that interaction of the magnets cause a current to flow in the windings 110 to drive an electrical load.

The stator core 104 can be formed from a plurality of axially stacked laminations, which are stacked along the rotation axis 144. In some embodiments, the laminations 116 are formed from a steel material, but one skilled in the art will readily appreciate that other materials may be utilized. In an alternative embodiment, the stator 104 can be formed as individual stator sections as is known in the art.

The stator windings 110, as shown, include core segments 110a extending through the stator core 104 and end turn segments 110b extending from each axial stator end of the stator core 104. As discussed above, when the stator windings 110 are energized via an electrical current therethrough, the resulting field drives rotation of the rotor 140 about the rotation axis 144.

Electric motors, as shown in FIGS. 1-2, may require cooling due to high density configurations, various operational parameters, or for other reasons. For example, high-power-density aviation-class electric motors and drives may require advanced cooling technologies to ensure proper operation of the motors/drives. These machines are generally thermally limited at high power ratings and their performance can be improved by mitigating thermal limitations. To maintain desired temperatures, a thermal management system (TMS) is integrated into the system, which provides cooling to components of the system. Onboard an aircraft, power requirements, and thus thermal management system (TMS) loads, are substantially higher during takeoff. Sizing of the TMS for takeoff conditions (i.e., maximum loads) results in a TMS having a high weight to accommodate such loads. This results in greater weight and lower power density during cruise conditions which do not generate such loads, and thus does not require a high cooling capacity TMS. Balancing weight constraints and thermal load capacities is important for such aviation applications.

Herein, channels in various parts of the stator assembly are disclosed as well as a header that delivers coolant into those channels and receives the "heated" coolant back from the channels. In one embodiment, the channels are formed in the windings 110. In another, the channels are formed in separators (discussed below) that are disposed between the windings. Of course, embodiments may also cover situations where channels are formed in both the windings and in the separators.

Figure 3A:
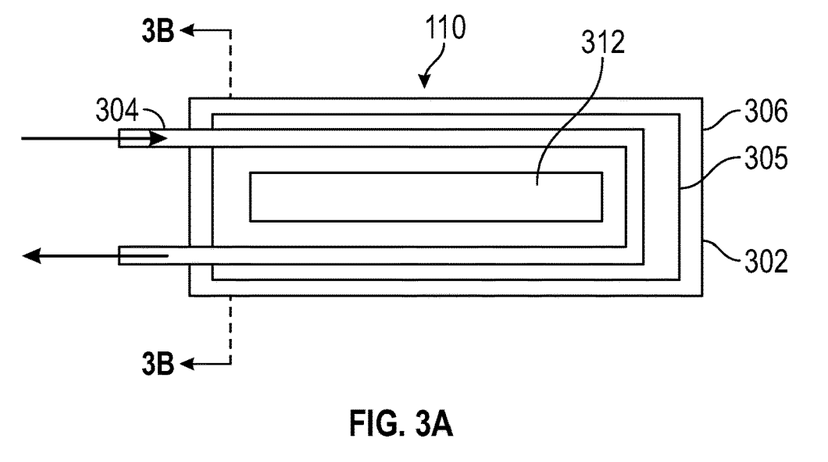
FIGS. 3A-3B show, respectively, a top view and cross section of stator winding with embedded cooling passages.
Figure 3B:
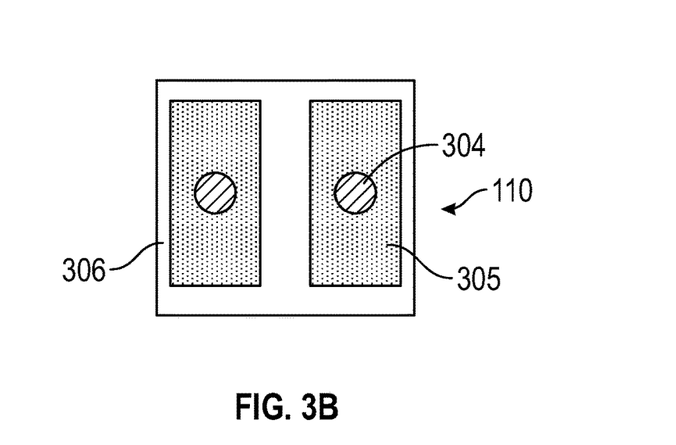
Figure 3C:
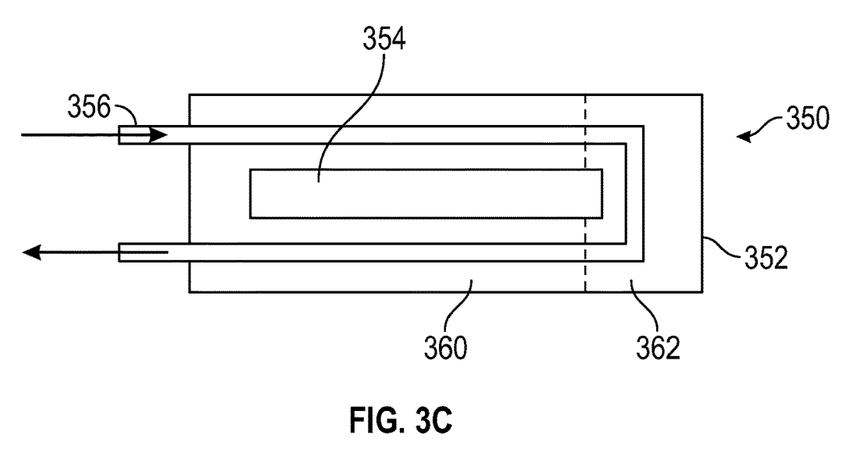
FIG. 3C shows a cross section of a winding separator with embedded cooling passages.

In FIGS. 3A and 3C show top views of an example winding 110 and a separator 350, respectively. One or more of the windings 110 can be disposed in the stator slots 112 (FIG. 2). In some instances, a separator 350 is disposed between some or all of the windings 110.

The winding 110 includes winding body 302. In one embodiment, the body 302 includes wire strands 305 supported or otherwise carried in a substrate 306. The strands can be formed or normal or Litz wire. The substrate 306 can be a non-conductive material in one embodiment. The substrate 306 can be a potting material in one embodiment.

Also enclosed in body 302 is a coolant passage 304. The coolant passage 304 can be formed as a tube that is either a separate element or that this formed by the substrate 306. It should be noted that in FIG. 3A there is an open region 312 in the substrate 306. That region can be omitted in one embodiment. The region can be filled by a stator tooth in use.

As shown in FIG. 3B, the wire strands 305 can be localized in a region 350 within the body 302. The passageway 304 is disposed between or near the strands 304 so that a coolant fluid passing through it is in close proximity to the strands 304 and can remove heat from them.

In FIG. 3A the arrows indicate one possible flow direction through the winding 110. Of course, the flow direction could be reversed in one embodiment. The header disclosed below provides the fluid that flows in/out of the winding 110. In more detail, fluid can flow into the passageway 304, traverse through the strands 305 and remove heat therein and then exit the winding 110. The coolant can enter as a liquid and vaporize (either totally or partially) as it traverses the winding 110 as heat is removed from the winding 110. Thus, the flow leaving the winding can be either gas, a liquid, or a combination thereof.

With reference now to FIG. 3C, the separator 350 includes separator body 352. The separator body 352 can be formed a solid piece of material or can include a hollow region 354 as shown in FIG. 3C. The separator 350/separator body 352 can be formed of a non-conductive material in one embodiment. In one embodiment, the separator 350 is formed of a ceramic material.

Enclosed in the separator body 352 is a coolant passage 356. The coolant passage 356 can be formed as a tube that is either a separate element or that this formed by the separator body 352.

In FIG. 3C the arrows indicate one possible flow direction through the separator 350. Of course, the flow direction could be reversed in one embodiment. The header disclosed below provides the fluid that flows in/out of the separator. In more detail, fluid can flow into the passageway 356, traverse through the separator body 352 and remove heat therein and then exit the separator 350. In one embodiment, the separator can be arranged adjacent to a winding 110 and remove heat from outer sides thereof. As before, the coolant can enter as a liquid (or a combination of a liquid and a gas) and vaporize (either totally or partially) as it traverses the separator as heat is removed from the separator. Thus, the flow leaving the separator 350 can be either gas, a liquid, or a combination thereof.

Optionally, and as shown by dashed lines, the separator 350 can be formed by a multiple portions including a main body 360 and end U turn 362.

Figure 4:
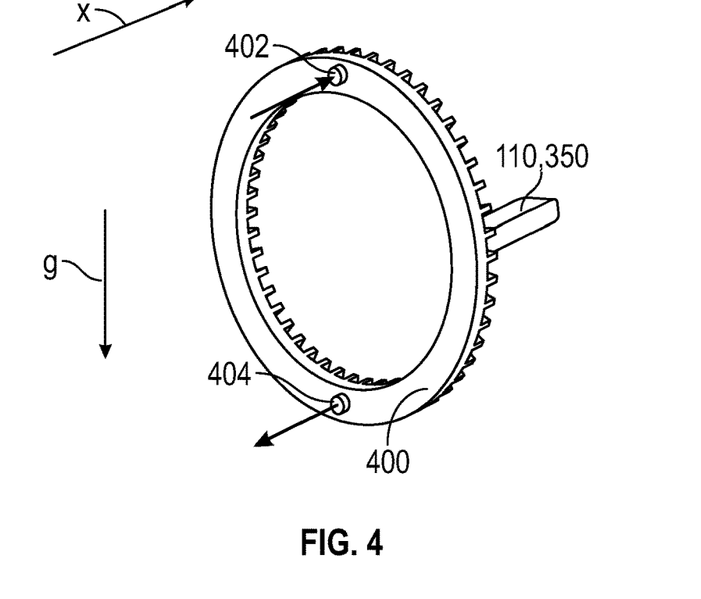
FIG. 4 shows a perspective view of a header according to one embodiment.

FIG. 4 shows an example of header 400 according to one embodiment. The header 400 is fluidly coupled to the windings 110/separators 350, of a stator and provides cooling fluid to and receives cooling fluid back from the windings/separators. For simplicity, only a single winding 110 and a single separator 350 (shown schematically as a pair) pair is illustrated in FIG. 4 but the skilled artisan will realize that the header 400 can be connected to any number of windings/separators. Further, while fluid flow will be described below in a system that include both windings and separators receiving fluid, only one could include flow passages and the other will not receive fluid. Further, it should be noticed that the separator 350 could be omitted on embodiment.

The header 400 includes an inlet 402 and an outlet 404. Cooling fluid enters the inlet 402, is directed through one or both of the winding 110 and the separator 350 and exits the header 400 via outlet 404. As shown, the header inlet 402 is above the outlet 404 with respect to gravity (arrow g). While not required, this configuration enhances flow and, in particular, result in an even flow. The coolant flows in/out of the inlet 402 and outlet 404 of the header 400 in an axial direction X.

In one embodiment, the header 400 can be configured such that cooling fluid enters the winding 110 and the separator 350 simultaneously. In such an embodiment, the fluid traverses the winding/separator 110/350 and returns to the header 400 and is directed towards the outlet 404.

In another embodiment, the cooling fluid enters the winding 110 first and, after traversing the winding 110, is directed into the separator 350. In such an embodiment, the fluid then returns to the header 400 and is directed towards the outlet 404.

Figure 5:
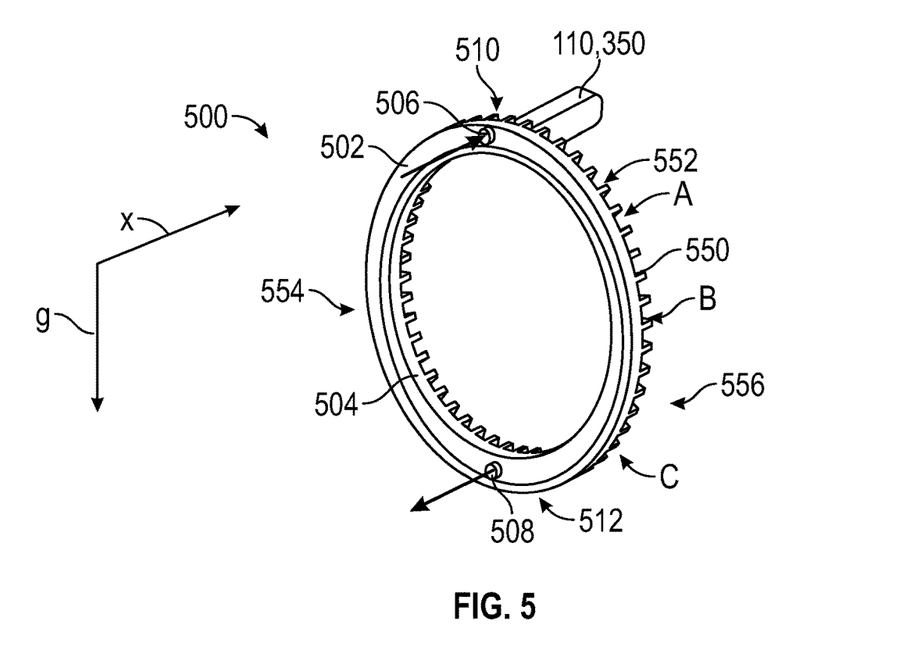
FIG. 5 is a perspective view of a header according to one embodiment that include eccentric plenums

Regardless of how the flow is provided into the windings/separators, to keep the incoming "cold" fluid from mixing with the "heated" fluid after it has passed through the windings/separators, the header can be separated into two plenums. With reference now to FIG. 5, an example of a header 500 can include in inlet plenum 502 and an outlet plenum 504. It should be understood that the discussion herein related to header 500 can optionally apply to any embodiment of a header disclosed herein.

In FIG. 5, the inlet plenum 502 may optionally surround the outlet plenum. The inlet plenum 502 is fluidly connected to the inlet 506 and the outlet plenum 504 is fluidly connected to the outlet 508. However, the inlet 506 is not fluidly connected to the outlet 508 within the body 520 of the header in this or any other embodiment. This ensures that the fluid that enters and the inlet 506 must enter the winding 110 or the separator 350 to travel from the inlet 506 to the outlet 508.

Figure 6A:
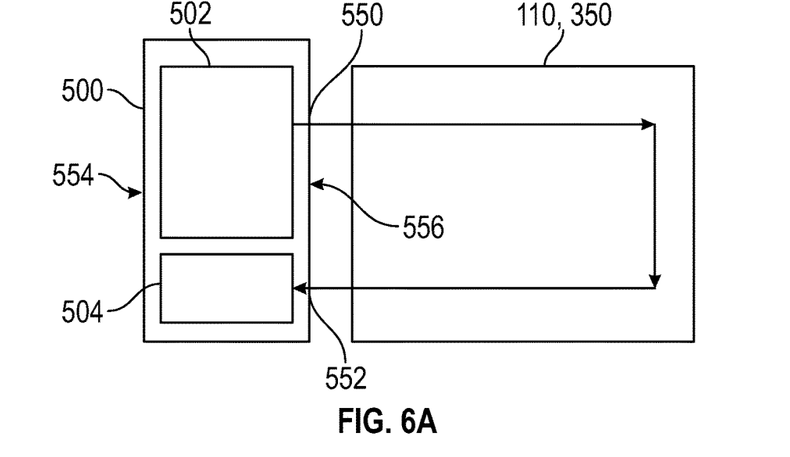
FIGS. 6A-6C show cross-sections of a portions of the header of FIG. 5 connected to a winding/separator taken at various locations of FIG. 5 to illustrate the variation in cross sectional areas of the inlet and outlet plenums.
Figure 6B:
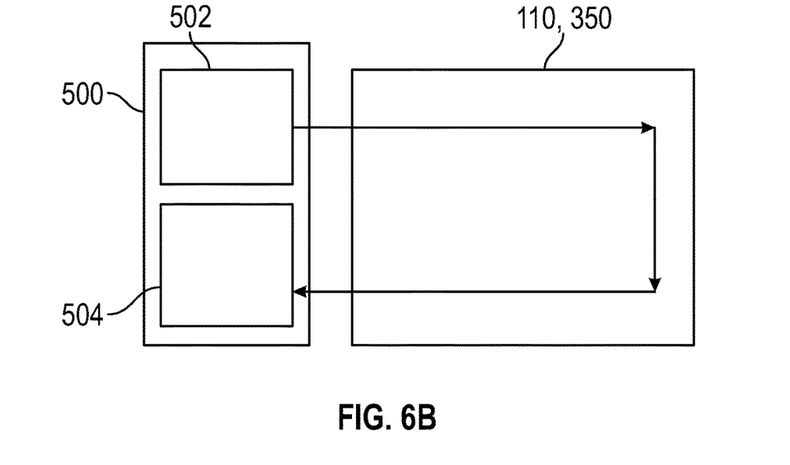
Figure 6C:
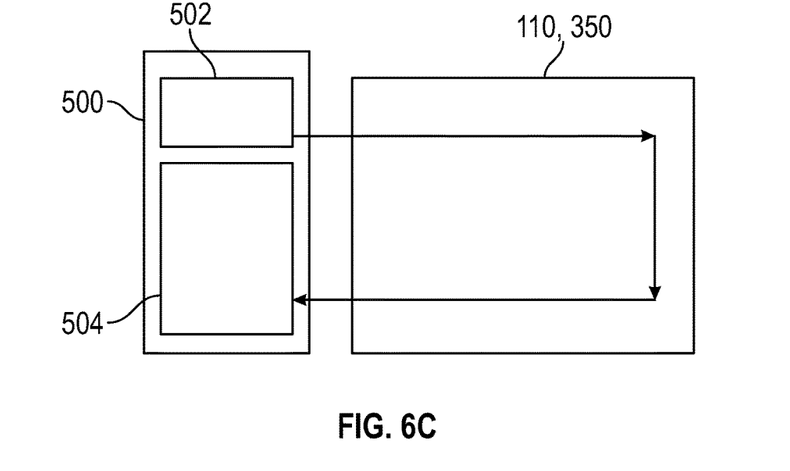

In more detail, and with reference also to FIG. 6, the header 500 include a front side 554 and a back side 556. The back side 556 can include a plurality of outlet passages 550 formed on the back side 556 of the header 500. The outlet passages 550 are in fluid communication with the inlet plenum 502 so that fluid that enters the main inlet 506 can exit the inlet plenum 502 and the header 502. The header 500 also includes a plurality of inlet passages 552 formed on the back side 556 of the header 500. The inlet passages are in fluid communication with the outlet plenum 504 so that fluid exiting through the outlet passages 550 and passing through a portion of the motor (e.g., through the winding/separator) can enter the outlet plenum 504.

The header 500 of FIG. 5 includes an optional feature related to the cross section of the inlet and outlet plenums 502, 504. In particular, the inlet plenum 502 can have a changing cross-sectional area in the g direction from the top 510 of the header 500 as compared to the bottom 512 of the header 500. In particular, the cross-sectional area is higher at the top 510 than at the bottom 512. Similarly, cross sectional area of the outlet plenum 504 can have an increasing cross-sectional area in the x direction from the top 510 of the header as compared to the bottom 510 of the header 500. The variation in cross-section can create a more even distribution of fluid to the windings/separators. In particular, the larger cross-section is needed to allow maximal fluid flow into the inlet plenum 502. This can provide the fluid for each winding/separator connected to the header. However, near the bottom 512 of the header 500 there will be relatively fewer windings/separators that need to receive fluid. Thus, the area needed to accommodate the flow will be less. The inverse is true for the outlet plenum 504. In particular, at the top of the header 500 only a few of the windings/separators will be "returning" fluid to the outlet plenum 504 while at the bottom 512 of the header, the fluid returned from most or all of the windings/separators will need to be accommodated leading to the desirability of the increased cross sectional area of the outlet plenum 504.

Reference can new be made to FIGS. 6A, 6B and 6C which show cross-sections taken along a radius of the header 500 at locations indicated, respectively, by arrows A, B and C in FIG. 5. In FIG. 6A the cross sectional area of the inlet plenum 502 is greater than the cross-sectional area of the outlet plenum 504. For context, a fluid flow through a winding 110 (or separator 350) is illustrated in FIG. 6A by arrows that show the fluid leaving the inlet plenum 502 via outlet passage 550, traversing the winding 110/separator 350 and entering the outlet plenum 504 via inlet passage 552.

In FIG. 6B the cross sectional area of the inlet plenum 502 is generally the same as the cross-sectional area of the outlet plenum 504. In FIG. 6C the cross sectional area of the inlet plenum 502 is less that the cross-sectional area of the outlet plenum 504.

Figure 7A:
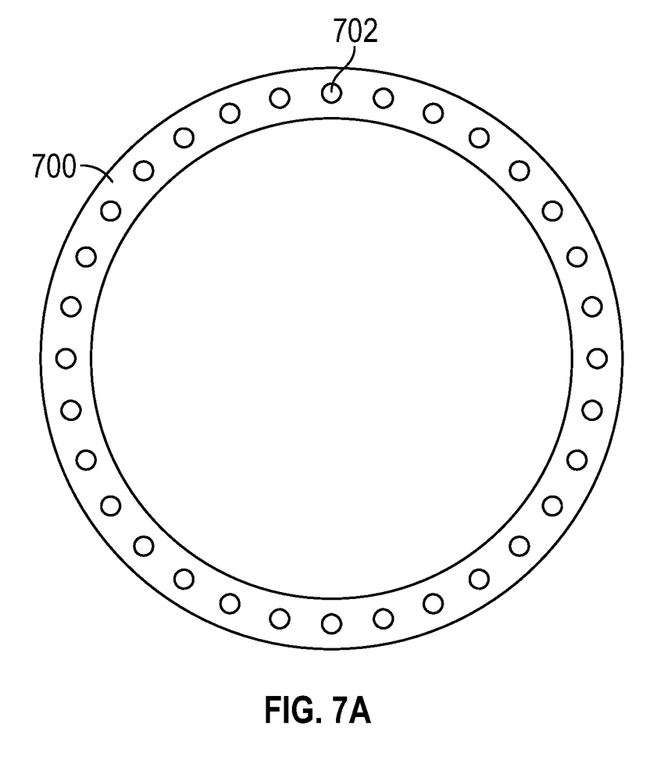
FIGS. 7A and 7B show, respectively, an orifice plate and the office plate disposed in the inlet plenum at the location shown in FIG. 6.
Figure 7B:
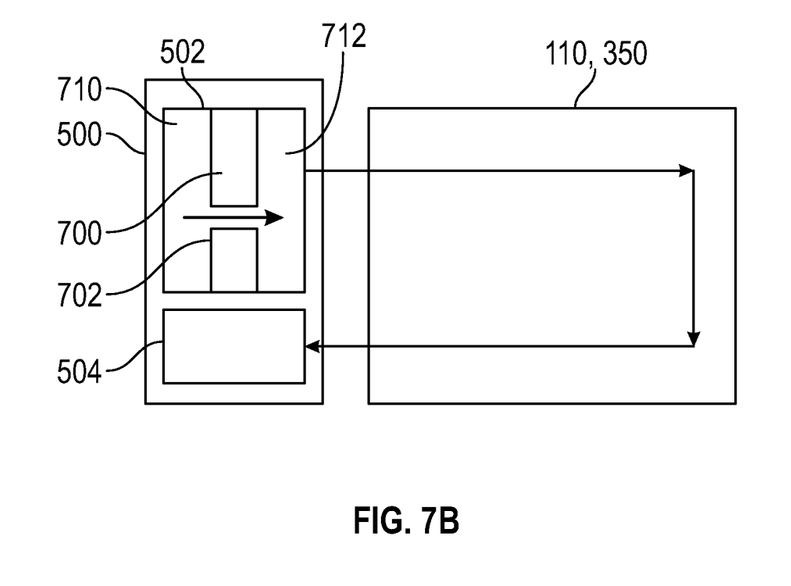

In any embodiment disclosed herein, to promote uniform flow distribution in many channels that connect to windings/separators an orifice plate can be added into the header. An example of such a plate 700 is shown in FIG. 7A and it is disposed in the inlet header 502 as shown in FIG. 7B.

The plate 700 can have one or more holes 702 formed therein. The plate 700 can be disposed or formed in the header 500 (or any other header disclosed herein) such that it divides one or both the plenums into two portion. As illustrated in FIG. 7B, the plate 700 may divide the inlet plenum 502 into a plenum inlet side 710 and a plenum outlet side. The plate 700 as shown has holes 702 with constant sizing. However, the size of the holes can vary in the circumferential direction. That is, in the context of FIG. 5, the holes can vary in size from the top 510 to the bottom 512 of the header in which the plate 700 is disposed.

Liquid enters the inlet plenum 502 on an inlet side 710 and proceeds through hole(s) 702 in an orifice plate 700. In an embodiment, the liquid emerges from the holes 702 as a two-phase mixture in the plenum outlet side 712. The two-phase mixture then proceeds into the passages used to cool the windings. The passages can include but are not limited to the passage 304 in inside of winding 110 (FIG. 3A) or passage 356 of separator 352 (FIG. 3B). Of course, the mixture could also pass through passages formed in other parts of the stator such as stator teeth 108 (FIG. 2).

Figure 8:
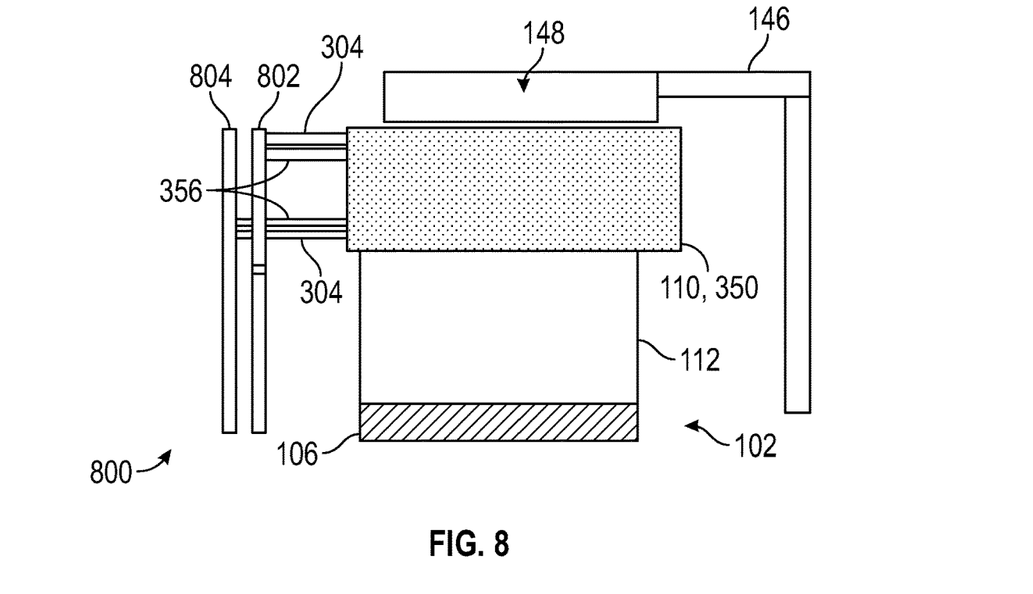
FIG. 8 shows a cross section of parts of motor arranged relative to a split header according to one embodiment.

In the prior description, the headers 400/500 have been described as having generally coplanar plenums. In another embodiment, and a shown in FIG. 8, a header 800 can be formed such that in includes two separated plenums. The two plenums are referred to as inlet plenum element 802 and outlet plenum element 804. In FIG. 8 the inlet plenum element 802 is closer to the stator 102 than the outlet plenum portion 804 but the order/relative positions could be reversed. Similar to the above description, coolant that enters the inlet plenum element 802 is provided into the winding/separator pair (shown generally by box 110,350) by passages 304, 356 respectively. In one embodiment fluid passes through the winding/separator and is returned through passages 304, 356 to the outlet plenum element 804. The inlet plenum element 802 can include the plate 700 described above.

As shown, the inlet plenum element 802 and the outlet plenum element 804 are spaced from one another but they could contact one another.

Further, it shall be noted the location of the header 800 relative to the stator 102 and rotor (e.g., magnet carrying structure 146 makes clear that the header 800 (or any other header) can be located next to a motor such that it provides a coolant to motor and, thus, the combination of a motor and any header disclosed herein can be referred to as a motor assembly.

In prior embodiment of the header disclosed herein it has been assumed that each winding and each separator is each directly connected to an individual outlet of the header (e.g., each winding/separator has a unique access into and out of the header. In the following embodiment, the back side of the header may include cross over channels such that a single out from the inlet plenum of the header and a single out input to the outlet plenum can cool either multiple windings, a winding/separator pair, or other combinations of windings/separators.

Figure 9:
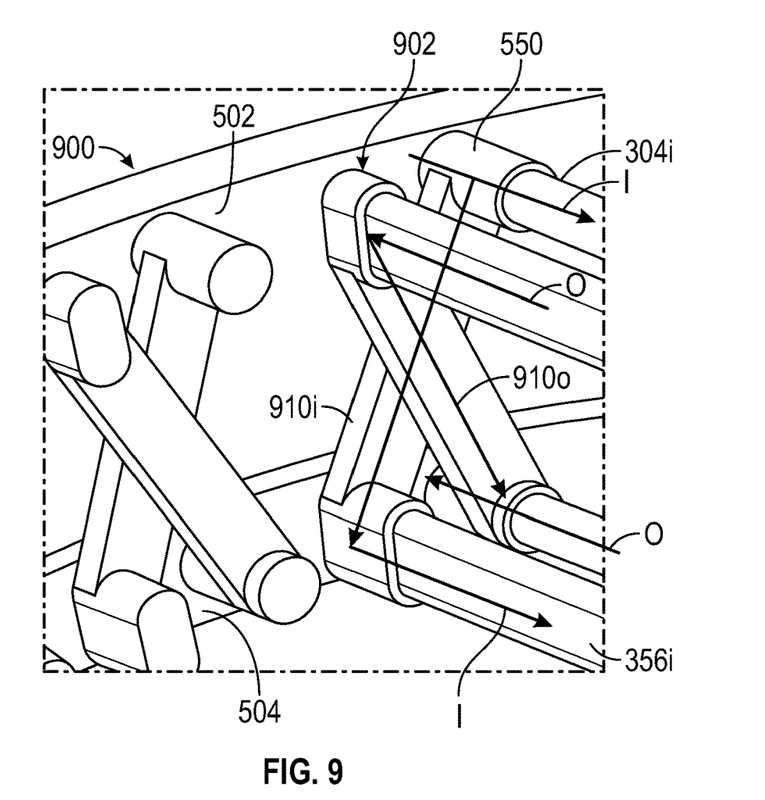
FIG. 9 shows a detailed view of interconnections on inlet and outlet passages formed on a header according to one embodiment.

For example, and with reference to FIG. 9, any header herein can include a front side 900 and a back side 902. The back side 902 can include cross over sections 910 that connect, for example. winding tubes 304 and separator tubes 356 together such that both can be supplied by a single output on the back side of the inlet plenum 502. In this manner, the cross over section allow a single outlet passage 550 to provide coolant to two locations (e.g., winding tubes 304 and separator tubes 356), In FIG. 9, the tubes are designated with an "i" and an "o" to indicate "in" and "out" respectively. As applied, a tube marked 304i will carry cool cooling fluid into a winding and a tube marked 304o will carry heated coolant out of the winding. The same is true of tubes in the separator/tooth.

As illustrated, inlet crossover tube 910i connects inlet connections 912, 914 which can be attached to winding tube 304i and separator tube 356i. The coolant enters both as shown by arrows I.

The coolant traverses the winding/separators and returns in respective winding 304o and separator tubes 356o. The returning coolant return flow is indicated by arrows O. Another cross over 910o connects tubes 304o and 356o such that fluid from both is return to the outlet plenum 504.

As arranged the "outer" portion of the winding is cooled at the same time as the inner portion of the separator to create a cross-flow cooling regime.

Figure 10:
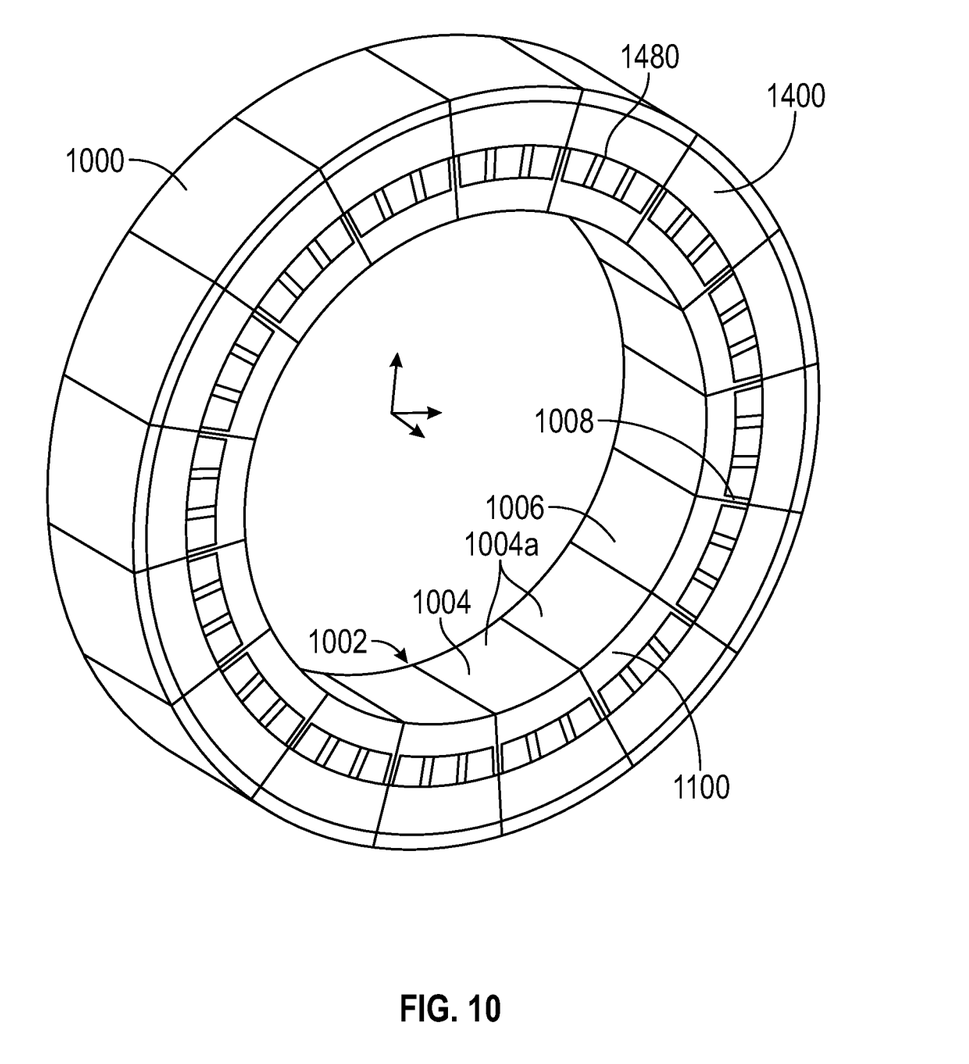
FIG. 10 shows a perspective of a portion of a motor according to one embodiment.

All of the above teachings can be applied various combinations of windings and separators/teeth. FIG. 10 shows a perspective view of a "back" of a stator/rotor combination. The combination shown in FIG. 10 is applicable to all embodiments and can be arranged proximate any of the headers disclosed herein so that coolant or other cooling methods (e.g., heat pipes) can be implemented.

For brevity, the combination shown in FIG. 10 will be referred to motor 1000. The motor 1000 includes a stator 1002. The stator is formed of a stator core 1004 and one or more stator windings 1100 supported or otherwise carried by the core 1004. As illustrated, the core 1004 is formed of separate stator segments 1004a that, when combined formed ring hub 1006 and a plurality of teeth 1008 that extend outwardly from the ring hub 106.

The motor 1000 also includes a rotor 1400. While not shown, it is understood that the rotor shown in FIG. 10 includes a rotor shaft that rotates about a rotation axis. The rotor 1400 carries one or more permanent magnets 1480. The motor 1000 works as described above.

Figure 11:
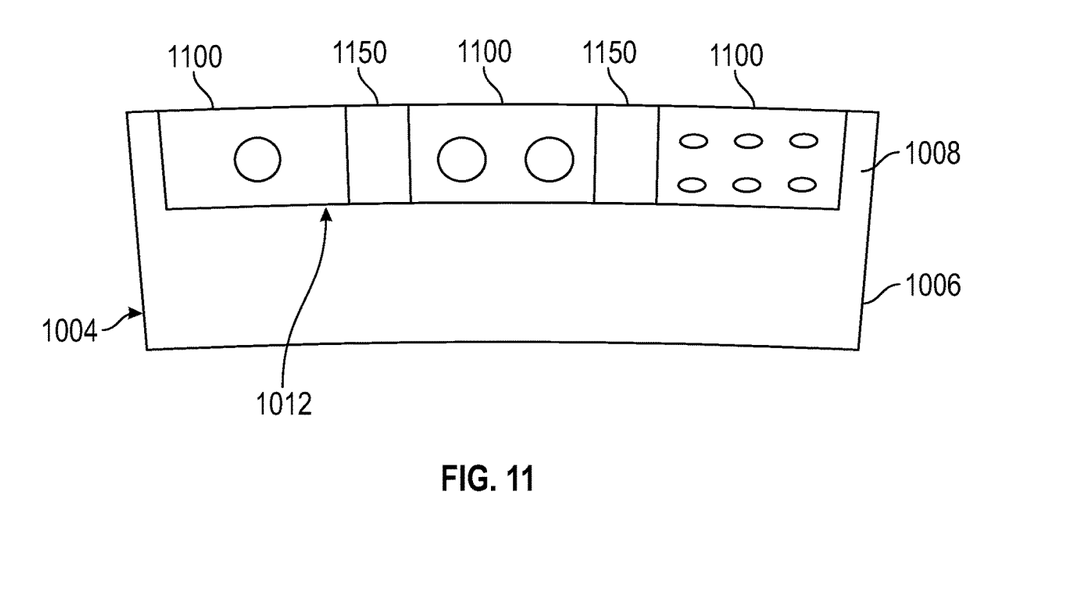
FIG. 11 shows several different winding passage configurations and spacer configurations arranged between two stator teeth.

As configured and with further reference to FIG. 11, the stator core 1004 includes ring hub 1006 and a plurality of teeth 1008 that extend outwardly from the ring hub 1006. The adjacent teeth 1008 form a stator slot 1012 into which one or more stator windings may be disposed. That is, each slot can have a single stator winding 1100 disposed therein or it can include two or more windings as shown in FIG. 10 and further examples below.

The windings 1100 can include cooling channels as described above. As illustrated in FIG. 10, each winding 1100 is separated from each other by separators 1150. These separators can be any separator as described herein.

As shown, there are three windings 1100 in the slot 1012. Each of the windings can have one or more flow channels formed in them. Different possible examples of flow channels per winding are indicated by the number dots in each winding. It shall be understood that in practice, windings will typically include the same number of channels and FIG. 11 is presented to show multiple possibilities in a single figure. Further, in one embodiment, the windings could include no flow passages.

As shown, each winding 1100 is separated from its adjacent neighbor by a separator 1150. Optionally, each separator 1150 can include a flow channel in the same manner as the windings 1100. Thus, based on FIG. 11 the skilled artisan will realize at least three configurations: 1) a configuration where both the separator 1150 and windings 1100 include flow channels; 2) a configuration where only the windings include flow channels; and 3) a configuration where only the separators 1150 include flow channels. Further, the skilled artisan will realize that the flow channels can be connected to any of the headers disclosed above so that coolant can be provided to them.

Figure 12:
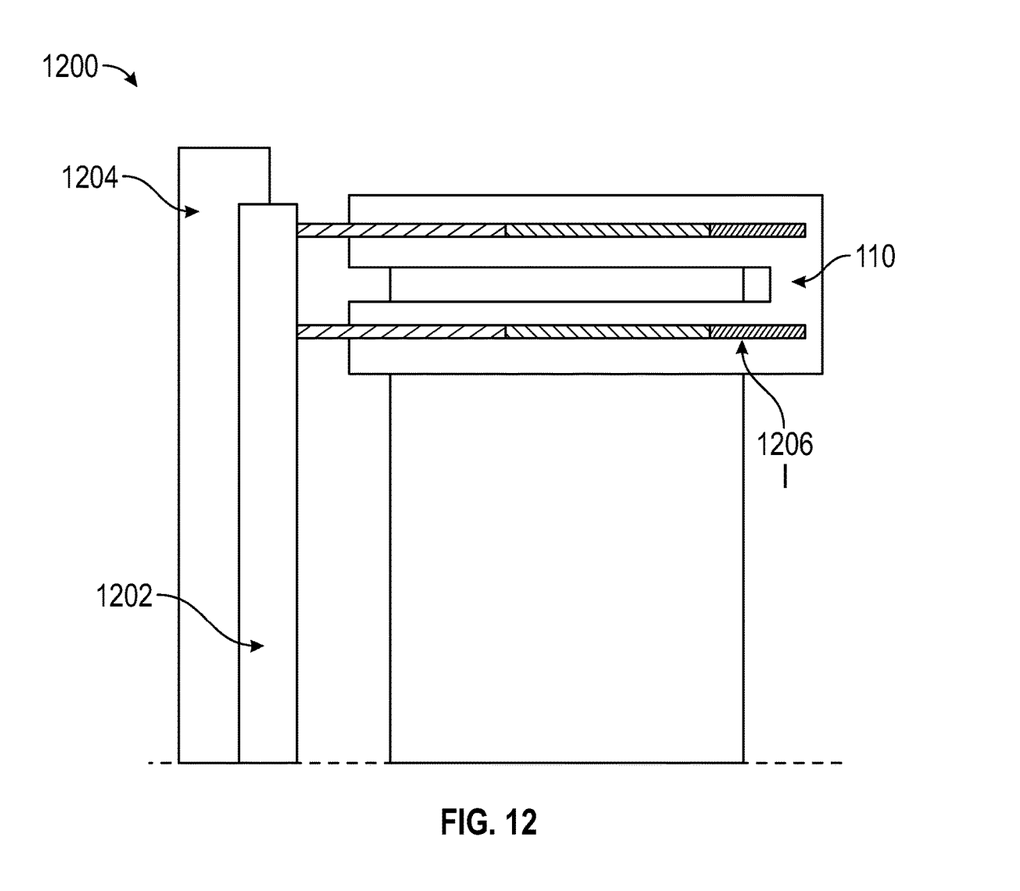
FIG. 12 shows parts of motor arranged relative to a header connected to heat pipes located within the motor.

Further, in another embodiment, the flow channels could not be utilized for coolant but, rather could include heat pipes in them instead. For example, and with reference now to FIG. 12, a header 1200 could be provided that is a combination of thermal spreader 1202 and a flow header 1204. The heat pipe 1206 can extend into the windings 110 and transfer heat to the thermal spreader. The windings can be any of the windings disclosed herein.

Figure 13:
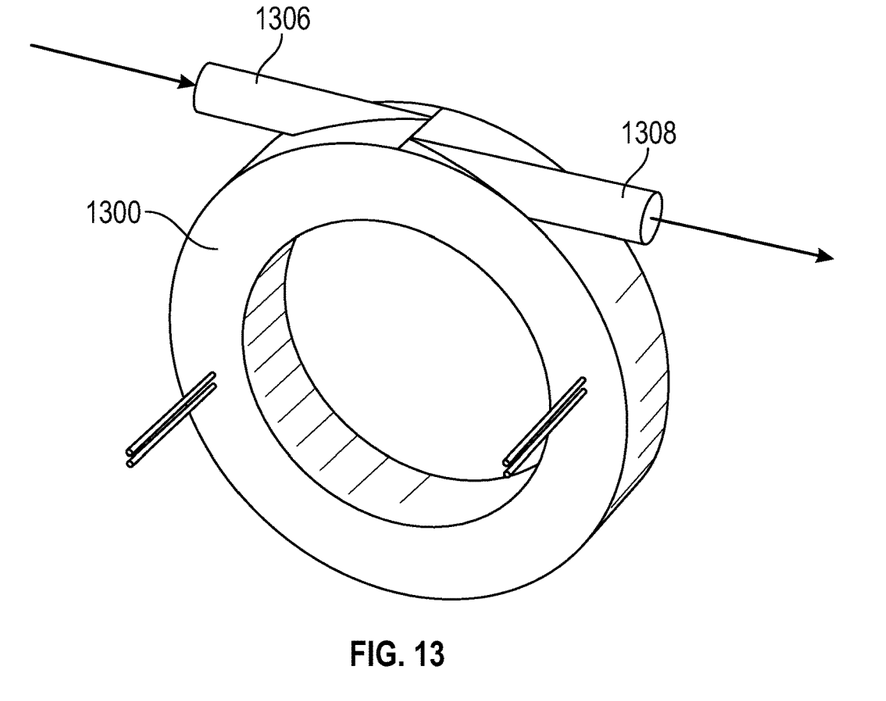
FIG. 13 shows a header with a tangential inlet/outlet combination.

In the previously described embodiments the flow into the headers has been shown to be in the axial direction X (see FIGS. 2, 4, and 5). It should be noted that other flow directions are contemplated. For example, FIG. 13 shows the inlet 1306 and an outlet 1308 arranged tangential to the header 1300. Header 1300 can be formed (other than the inlet/outlet) in the same manner as described for any header herein.

Figure 14:
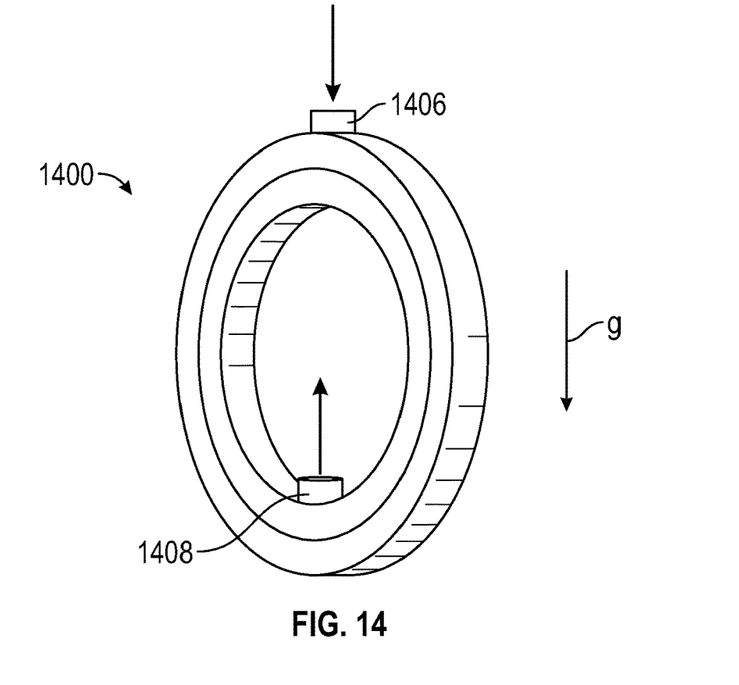
FIG. 14 shows a header with a vertical inlet/outlet combination.

Alternatively, and as shown in FIG. 14, the inlet 1406 and the outlet could have flow that is vertically oriented. Header 1400 can be formed (other than the inlet/outlet) in the same manner as described for any header herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A header for an electric machine that include a stator core and one or more windings that include coolant passages formed therein, the header comprising:
    an inlet to receive a coolant;
    an outlet though which the coolant exits the header,
    an inlet plenum fluidly connected to the inlet; and
    an outlet plenum fluidly separated from the inlet plenum and fluidly connected to the outlet;
    wherein the inlet and outlet plenums each have a varying cross section that varies from a top of the header as compared to a bottom of the header;
    wherein the inlet is a main inlet and the outlet is a main outlet and the header includes a front side and a back side;
    the header further comprising:
    a plurality of outlet passages formed on back side of the header and in fluid communication with the inlet plenum so that coolant that enters the main inlet can exit the inlet plenum and the header; and
    a plurality of inlet passages formed on a back side of the header and in fluid communication with the outlet plenum so that coolant that exited through the outlet passages and passed through a portion of a motor can enter the outlet plenum;
    wherein at least one of the plurality of outlet passages is connected to another one of the plurality of outlet passages by a first crossover section.

2. The header of claim 1, wherein the inlet plenum and the outlet plenum are co-planar.

3. The header of claim 1, wherein the inlet plenum and the outlet plenum are side by side and spaced parallel to each other.

4. The header of claim 1, wherein the inlet plenum includes an orifice plate disposed therein that divides the inlet plenum into a plenum inlet side and a plenum outlet side.

5. The header of claim 4, wherein the orifice plate includes a plurality of holes therein.

6. The header of claim 1, wherein at least one of the plurality of inlet passages is connected to another one of the plurality of inlet passages second crossover section.

7. The header of claim 1, wherein the inlet and outlet are arranged to receive and output coolant along an axial direction of the header.

8. The header of claim 1, wherein the inlet and outlet are arranged to receive and output coolant along a direction tangential to the header.

9. The header of claim 1, wherein the inlet and outlet are arranged to receive and output coolant along a vertical direction of the header.

10. A motor comprising:
    a rotor;
    a stator; and
    a header as recited in claim 1.

11. A header for an electric machine that include a stator core and one or more windings that include coolant passages formed therein, the header comprising:
    an inlet to receive a coolant;
    an outlet though which the coolant exits the header,
    an inlet plenum fluidly connected to the inlet; and an outlet plenum fluidly separated from the inlet plenum and fluidly connected to the outlet;

wherein the inlet and outlet plenums each have a varying cross section that varies from a top of the header as compared to a bottom of the header;

wherein the inlet is a main inlet and the outlet is a main outlet and the header includes a front side and a back side;

the header further comprising:

a plurality of outlet passages formed on back side of the header and in fluid communication with the inlet plenum so that coolant that enters the main inlet can exit the inlet plenum and the header; and a plurality of inlet passages formed on a back side of the header and in fluid communication with the outlet plenum so that coolant that exited through the outlet passages and passed through a portion of a motor can enter the outlet plenum;

wherein the inlet plenum includes an orifice plate disposed therein that divides the inlet plenum into a plenum inlet side and a plenum outlet side;

wherein the orifice plate includes a plurality of holes therein;

wherein the holes vary in size from the top of the header to the bottom of the header.

12. The header of claim 5, wherein coolant is received into the inlet plenum in the plenum inlet side, passes through the holes, enters into the plenum outlet side and then exits the header via the outlet passages.

13. A motor comprising:
a rotor;
a stator; and
a header as recited in claim 11.

14. The header of claim 11, wherein the inlet and outlet are arranged to receive and output coolant along an axial direction of the header.

15. The header of claim 11, wherein the inlet and outlet are arranged to receive and output coolant along a direction tangential to the header.

16. The header of claim 11, wherein the inlet and outlet are arranged to receive and output coolant along a vertical direction of the header.

17. A header for an electric machine that include a stator core and one or more windings that include coolant passages formed therein, the header comprising:

an inlet to receive a coolant;

an outlet though which the coolant exits the header, an inlet plenum fluidly connected to the inlet; and an outlet plenum fluidly separated from the inlet plenum and fluidly connected to the outlet;

wherein the inlet is a main inlet and the outlet is a main outlet and the header includes a front side and a back side;

the header further comprising:

a plurality of outlet passages formed on back side of the header and in fluid communication with the inlet plenum so that coolant that enters the main inlet can exit the inlet plenum and the header; and a plurality of inlet passages formed on a back side of the header and in fluid communication with the outlet plenum so that coolant that exited through the outlet passages and passed through a portion of a motor can enter the outlet plenum;

wherein at least one of the plurality of outlet passages is connected to another one of the plurality of outlet passages by a first crossover section.

18. The header of claim 17, wherein the inlet plenum and the outlet plenum are co-planar.

19. The header of claim 17, wherein the inlet plenum and the outlet plenum are side by side and spaced parallel to each other.

20. The header of claim 17, wherein the inlet plenum includes an orifice plate disposed therein that divides the inlet plenum into a plenum inlet side and a plenum outlet side.

* * * * *